March 25, 1969 R. M. WHITMAN 3,434,919
DECORATIVE LAMINATED ARTICLE WITH TRANSPARENT
OVERLAY SHEET AND METHOD OF MAKING IT
Original Filed May 4, 1964

Before Treatment          After Treatment

INVENTOR.
ROBERT M. WHITMAN

ATTORNEY

United States Patent Office 3,434,919
Patented Mar. 25, 1969

3,434,919
DECORATIVE LAMINATED ARTICLE WITH TRANSPARENT OVERLAY SHEET AND METHOD OF MAKING IT
Robert M. Whitman, Newark, Del., assignor to The Budd Company, Philadelphia, Pa., a corporation of Pennsylvania
Continuation of application Ser. No. 364,472, May 4, 1964. This application Nov. 30, 1967, Ser. No. 687,072
Int. Cl. D21h 1/02
U.S. Cl. 162—123          7 Claims

ABSTRACT OF THE DISCLOSURE

A high clarity resin saturable overlay paper for a decorative laminate includes a paper having permanently swollen alpha cellulose fibers blended in unswollen alpha cellulose fibers with the swelling causing central canals of the swollen fibers to close around their outer walls to prevent the entrapment of air therein.

---

This application is a continuation of Ser. No. 364,472, filed May 4, 1964, and now abandoned.

This invention relates to decorative laminates and, more particularly, to an improved overlay paper and to a method of making it.

A conventional practice in making decorative laminates is to support a resin impregnated decorative sheet on resin impregnated core sheets and to cover the decorative paper with a transparent, protective lamina known as an overlay or overlay sheet. Overlays commonly contain melamine resin impregnating either rayon fibers for high cost, high clarity overlays or bleached wood pulp of high alpha cellulose content. This latter type of overlay is known as alpha overlay, and, while it is cheaper than a rayon overlay, it is disadvantageous because an alpha overlay is perceptively cloudy or hazy and thus impairs the clarity of the decorative effect.

Thus, one of the objects of the invention is to provide an inexpensive, improved, high clarity alpha overlay paper and method of making it.

Another object is to provide an alpha overlay that is free of the haziness and cloudiness common to prior art alpha overlay paper.

Figure 1:
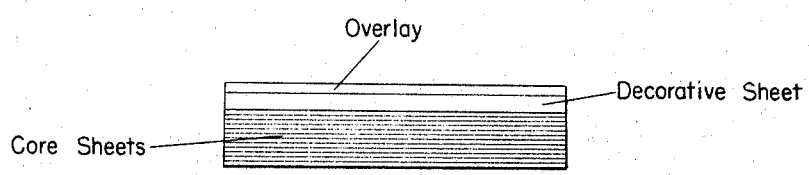
Figure 2:
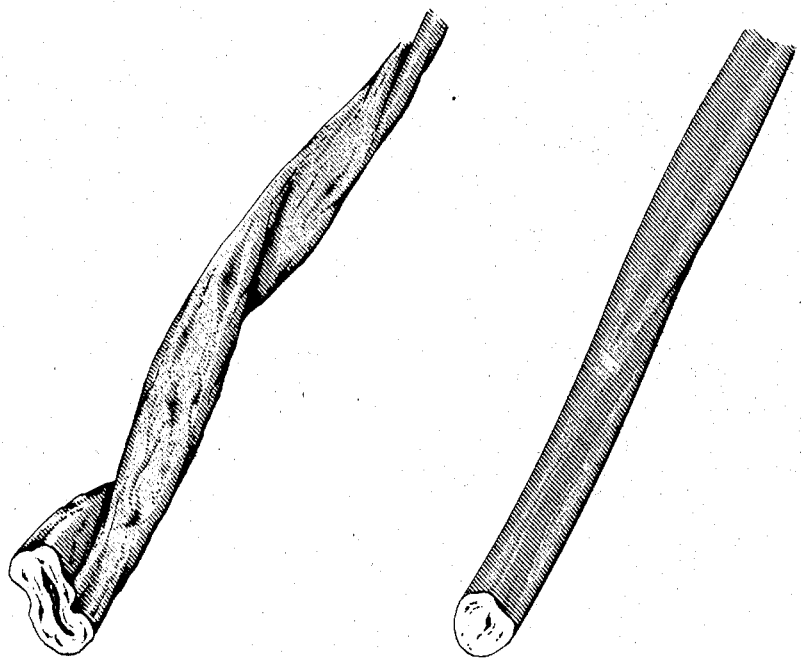

Other objects and advantages will be apparent from the following description taken in connection with the accompanying drawing wherein:

FIG. 1 is a schematic, enlarged edge view of a decorative laminate embodying the invention, and FIG. 2 illustrates enlarged pictorial views of fibers before and after treatment in accordance with the invention.

Referring now to the drawing, FIG. 1 shows a decorative laminate comprising a lamina of phenolic resin impregnated kraft core sheets supporting a decorative sheet having a pigmented and/or printed decoration. The decorative sheet is laminated to a high clarity alpha overlay.

In accordance with the invention, the core sheets and the decorative sheet are made by conventional methods and the impregnation of the overlay paper and the laminating of all the layers to form the decorative laminate are done by conventional processes. However, the overlay paper is made by the improved process, described below, whereby the resultant overlay is clearer than alpha overlays made in accordance with the prior art.

In general, overlay paper is made in accordance with the invention by treating pulp of high alpha cellulose content in a permanent swelling agent such as a solution of sodium hydroxide. Thereafter, the pulp is washed, beaten, drained and dried to form a sheet of overlay paper that can be then impregnated with melamine resin and dried to form an overlay sheet. The treated pulp can be used by itself to form the paper or it can be blended with untreated pulp to increase the strength of the resultant paper. When treated and untreated fibers are blended, the relative amount of treated fibers necessary to increase the clarity of the resultant overlay is not critical but presents a linear relationship where increases in the proportion of treated fibers increases the clarity. The untreated pulp increases the sheet strength since treated fibers, when beaten, develop fiber bonding much more slowly than beaten untreated fibers. The use of the untreated pulp also reduces raw material costs and the preferred amount thereof, which is a balance of the factors of cost, strength and clarity, is around 50% of the total pulp content. A resin can be added to the beaten pulp to increase the wet strength of the overlay paper.

The superior clarity of the overlay of the invention is explainable as follows. Prior art rayon overlay paper is superior to the prior art alpha overlay paper because a rayon fiber is of solid, substantially circular cross section while an unswollen, untreated alpha cellulose fiber is irregularly shaped, as illustrated in FIG. 2, and has a central canal or lumen so that air is entrapped, upon impregnation with melamine, in the outer folds and in the lumen of each fiber and refracts light causing cloudiness or haziness in the overlay. By treating the pulp with the swelling agent, the irregularly shaped fibers are each swollen permanently to a substantially circular cross section wherein the lumen is closed or nearly closed, as shown in FIG. 2. By thus decreasing the amount of air entrapped in the lumen and by decreasing or eliminating the tendency for the outer portions to entrap air, the resultant overlay formed from such treated fibers is perceptively free from haziness or cloudiness.

The invention is further illustrated by the following specific examples.

*Example 1.*—300 grams of a fast beating bleached sulphite pulp were treated in a 20% sodium hydroxide solution at 84° F. for two minutes to swell the fibers. The pulp was then washed with water for two hours after which residual caustic was neutralized with hydrochloric acid. The pulp was then beaten in a laboratory Valley beater for 60 minutes. Hand sheets were then prepared by draining and drying the beaten pulp to a basis weight of 28 pounds, 24" x 36"–500 sheets, and the hand sheets were impregnated with melamine resin to a resin content on a weight basis of 65% to 70%. The resultant overlay sheet was then laminated over a pigmented decorative paper of 50% melamine resin content supported by kraft core sheets of 20% phenolic resin content, at 1100 pounds per square inch pressure and 280° F. for 25 minutes. The decorative laminate thus formed had an overlay that in comparison with laminates made with commercially available alpha overlay paper and rayon overlay paper, has a clarity as great as that of the rayon overlay and free of the haziness of the alpha overlay.

*Example 2.*—Bleached alpha sulphate pulp was treated in a 15% sodium hydroxide solution for 30 seconds to swell it and it was then washed and beaten to 700 cc. Canadian standard freeness. An equal quantity of bleached alpha sulphate pulp, beaten to 650 cc. Canadian standard freeness, was mixed with the first quantity and the resultant mixture was refined to a Canadian standard freeness of 470 cc. Five percent melamine wet strength resin was added and the resultant mixture was formed into overlay paper on a Fourdrinier paper machine in a conventional manner. The paper was thereafter impregnated with melamine resin to a resin content of 65% to 70% to form an overlay sheet. Finally, this overlay sheet was laminated in the manner of Example 1 to form a decorative laminate which had a perceptively greater clarity than laminates made with prior art alpha overlay paper.

While I have disclosed only two illustrative examples, it is to be understood that the swelling of the fibers can be accomplished by other swelling agents well known in the art and that the invention is not to be limited except as defined in the appended claims.

I claim:

1. A process for making a decorative laminated article having a high clarity alpha overlay sheet thereon, the steps comprising: providing a pulp having fibers of alpha cellulose; swelling the fibers to close their central canals and round their outer walls permanently; beating the pulp; impregnating said pulp with a melamine resin sufficient in quantity to make a resulting overlay sheet transparent; forming the beaten pulp with said melamine resin into overlay paper; and applying said overlay paper to said laminated article.

2. A process for making a decorative article having a high clarity overlay paper thereon, the steps comprising: providing a first batch of pulp comprising alpha cellulose fibers; swelling such fibers to close their central canals and round their outer walls; beating said first batch after said swelling; providing a second batch of pulp having cellulose fibers; beating said second batch; blending said beaten first and second batches; impregnating said batches with melamine resin sufficient in quantity to make a resulting overlay sheet transparent; forming said blended batches with said melamine resin into overlay paper; and applying said overlay paper to said laminated article.

3. The process of claim 2 wherein said swelling is accomplished by treating said first batch with a solution of sodium hydroxide, having a swelling concentration.

4. In a process for making a decorative laminate by laminating a supporting layer of phenolic impregnated kraft core sheets, a decorative layer of melamine impregnated decorative paper and a protective layer of melamine impregnated overlay paper, the steps for making the decorative laminate comprising: providing a bleached alpha wood pulp having fibers of alpha wood pulp having fibers of alpha cellulose; swelling such fibers by use of a solution of sodium hydroxide to close their central canals and round their outer walls permanently; forming an overlay paper from the swollen fibers; and applying said overlay paper to said decorative layer.

5. A laminated article having high clarity resin saturable overlay paper thereon comprising a paper having permanently swollen alpha cellulose fibers blended with unswollen alpha cellulose fibers, said swollen alpha cellulose fibers having their lumens partly closed to minimize the entrapment of air therein, a melamine resin impregnating said paper sufficient in quantity to make said paper transparent, said paper being bonded to said laminated article.

6. A paper in accordance with claim 5 wherein said paper further comprises a resin increasing the wet strength of said paper.

7. A decorative article comprising a decorative laminate having a supporting layer and a decorative layer bonded to said supporting layer, an alpha overlay sheet for protecting said laminate layer coated to said decorative layer, said overlay sheet comprising: fibers of alpha cellulose swollen to close their central canal and to round their outer portions, said fibers forming a sheet of paper and a resin impregnating said paper, said resin including melamine in sufficient quantity to make said overlay sheet transparent.

References Cited

UNITED STATES PATENTS

| 1,945,538 | 2/1934 | Schwartz | 162—187 X |
| 2,186,034 | 1/1940 | Murdock | 162—187 X |
| 2,792,765 | 5/1957 | Kerridge et al. | 162—141 X |
| 3,151,017 | 9/1964 | Brafford | 162—141 |

OTHER REFERENCES

Wightman: Practical Paper Making (Refining) from the Paper Industry, vol. 44, #8, pages 463 to 465, November 1962.

HOWARD R. CAINE, *Primary Examiner.*

U.S. Cl. X.R.

161—6, 263, 413; 162—141